(No Model.)
J. Y. DYE.
COTTON CHOPPER.
No. 487,725. Patented Dec. 13, 1892.
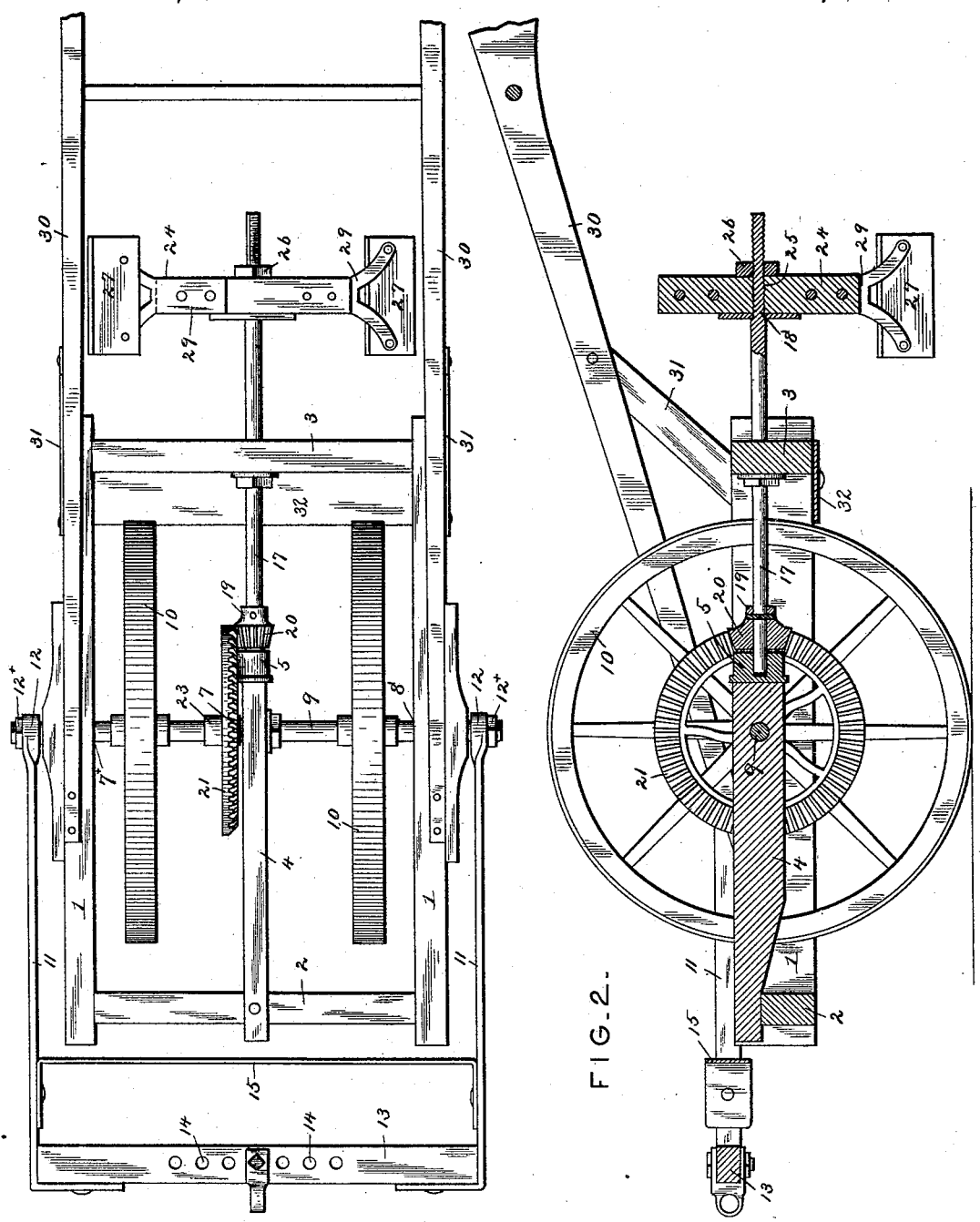
Witnesses
Harry L. Ames.
J. W. Siggers.
Inventor
J. Y. Dye.
By his Attorneys,
C. A. Snow & Co.
THE NORRIS PETERS CO., PHOTO-LITHO., WASHINGTON, D. C.

UNITED STATES PATENT OFFICE.

JOHN Y. DYE, OF KNOWLES, LOUISIANA.

COTTON-CHOPPER.

SPECIFICATION forming part of Letters Patent No. 487,725, dated December 13, 1892.

Application filed August 2, 1892. Serial No. 441,953. (No model.)

*To all whom it may concern:*

Be it known that I, JOHN Y. DYE, a citizen of the United States, residing at Knowles, in the parish of Lincoln and State of Louisiana, have invented a new and useful Cotton-Chopper, of which the following is a specification.

My invention relates to improvements in cotton-choppers, the objects in view being to provide a cheap and simply-constructed machine adapted to chop or thin out cotton effectually, and to provide means for positively rotating the chopper by means of the axle and intermediate connections.

Other objects and advantages of the invention will appear in the following description, and the novel features thereof will be particularly pointed out in the claims.

Referring to the drawings, Figure 1 is a plan view of the cotton-chopper embodying my invention. Fig. 2 is a vertical longitudinal section thereof.

Like numerals of reference indicate like parts in both figures of the drawings.

In constructing the framework of my invention I employ a pair of longitudinal parallel frame-bars 1, into the ends of which I let, by the usual tenon and mortise, front and rear transverse frame-bars 2 and 3, respectively. From the front frame-bar 2 there extends rearward between the bars 1 an intermediate longitudinal bar 4, whose rear end extends beyond the transverse center of the machine, where it is provided with a bearing-socket 5, longitudinally opposite a bearing opening formed in the rear bar of the frame. The bar 4 at the center of the frame has a transverse bearing, and corresponding and transversely-opposite bearings 8 are formed at the longitudinal centers of the opposite side frame-bars 1. In these three bearings 7 and 8 there is journaled a transverse axle 9, whose ends project beyond the before-mentioned bearings 8. Ground-wheels 10 are mounted rigidly upon and designed to rotate with the axle, said wheels being situated one at each side of the intermediate longitudinal bar 7.

A pair of draft-rods 11, whose rear ends terminate in eyes 12, are loosely connected with the extremities of the axle 9, they being maintained in position upon said axle by a pair of nuts 12×, which are threaded on the extremities of the axle. The front ends of these draft-bars are inwardly bent to overlap the front face of a transverse connecting-bar 13, to which said draft-bars are bolted. The bar 13 is provided with a series of perforations 14, and with the same is designed to be connected the D-iron or other ordinary clevis connection. In rear of the bar 13 the draft-rods are braced apart by means of a transverse intermediate bar 15.

In the bearings 5 and 6 a rotatable longitudinal chopping-shaft 17 is mounted and has its rear end extended through and beyond the latter bearing, where it is reduced or flattened at diametrically-opposite sides, and upon its flattened sides is threaded, thus forming a tenon 18, adapted to receive the chopping-head. Immediately in rear of the bearing is a collar 19, mounted on the shaft 17, and near the front end of the shaft, slightly in rear of the bearing-socket 5, a small beveled pinion 20 is mounted on the shaft. This pinion is engaged with and receives motion from a master-gear 21, located upon the axle 9 at one side of the bar 4. A collar 23 is also located on the axle at the opposite side of gear 21.

24 designates a rotatable chopping-head, which is provided with a central angular opening 25, through which projects the rear reduced and flattened end of the chopping-shaft. By reason of the angular shape given to the rear end of the shaft and to the opening in the head, the chopping head and shaft are compelled to move together. A nut 26 or other equivalent means may be employed for securing the chopping-head in position.

At diagonally-opposite corners of the chopping-head are located chopping-knives or hoes 27, which are disposed in opposite direction and set at an angle to the head. These chopping-hoes have their tangs 29 bolted to the faces of the head, as shown.

30 designates a pair of handles secured rigidly to the frame-bars 1, connected at their inner ends by a transverse rung and supported by a pair of short standards 31.

Secured to the under side and near the rear end of the rectangular frame, by any suitable means, is a transverse metal blade 32, whose front edge, lying close to the wheels, removes therefrom any mud that may adhere to them.

It will be seen that the draft-frame is loosely hung upon the axle, whereby the machine is capable of oscillating with its axle independently of the draft-frame.

Having described my invention, what I claim is—

In a cotton-chopper, the combination, with the rectangular frame provided at opposite sides with bearings, the transverse axle mounted in the bearings and projecting beyond the same, the ground-wheels mounted on the axle between the bearings and within the frame, the rearwardly-disposed rotatable chopping-shaft provided with choppers or hoes, and means for transmitting motion from said axle to the chopping-shaft, of the opposite metal straps outside and independent of the main frame terminating at their rear ends in eyes, said straps having their rear ends engaging the ends of the axle and their front ends inwardly bent to embrace the opposite ends of and bolted to a transverse draft-bar, which latter is provided with a longitudinal series of perforations adapted to receive the draft-clevis, substantially as specified.

In testimony that I claim the foregoing as my own I have hereto affixed my signature in the presence of two witnesses.

JOHN Y. DYE.

Witnesses:
C. H. HENRY,
D. L. HENRY.